(12) United States Patent
Knoerle et al.

(10) Patent No.: US 10,647,605 B2
(45) Date of Patent: May 12, 2020

(54) METHOD AND DEVICE FOR THE TREATMENT OF ORGANIC MATTER, INVOLVING RECIRCULATION OF DIGESTED SLUDGE

(71) Applicant: ELIQUO STULZ GMBH, Grafenhausen (DE)

(72) Inventors: Ulrich Knoerle, Waldburg (DE); Marianne Buchmueller, Uehlingen-Birkendorf (DE)

(73) Assignee: ELIQUO STULZ GMBH, Grafenhausen (DE)

( * ) Notice: Subject to any disclaimer, the term of this patent is extended or adjusted under 35 U.S.C. 154(b) by 175 days.

(21) Appl. No.: 15/523,410

(22) PCT Filed: Oct. 30, 2015

(86) PCT No.: PCT/EP2015/002172
§ 371 (c)(1),
(2) Date: May 1, 2017

(87) PCT Pub. No.: WO2016/066273
PCT Pub. Date: May 6, 2016

(65) Prior Publication Data
US 2017/0305774 A1 Oct. 26, 2017

(30) Foreign Application Priority Data
Oct. 30, 2014 (EP) .................................. 14003669.0

(51) Int. Cl.
*C02F 11/04* (2006.01)
*C02F 11/18* (2006.01)
(Continued)

(52) U.S. Cl.
CPC .............. *C02F 11/04* (2013.01); *C02F 11/18* (2013.01); *C05F 7/00* (2013.01); *C05F 17/0027* (2013.01);
(Continued)

(58) Field of Classification Search
CPC combination set(s) only.
See application file for complete search history.

(56) References Cited

U.S. PATENT DOCUMENTS

| 4,915,840 A | 4/1990 | Rozich |
| 5,635,069 A | 6/1997 | Boss et al. |

(Continued)

FOREIGN PATENT DOCUMENTS

| DE | 19621426 A1 | 1/1997 |
| DE | 19858187 C5 | 5/2006 |

(Continued)

OTHER PUBLICATIONS

Extended European Search Report dated Apr. 28, 2015, Application No. 14003669.0-1357, 7 Pages.
(Continued)

*Primary Examiner* — Dirk R Bass
(74) *Attorney, Agent, or Firm* — Brooks Kushman P.C.

(57) ABSTRACT

The present invention relates to a method for the treatment of organic matter, in particular sewage sludge, where the organic matter is first fed to a disintegration system. The organic matter is then subjected to thermal hydrolysis in the disintegration system to form disintegrated matter. The disintegrated matter is fed to a digester in which the disintegrated matter is at least partially digested such that digested sludge is formed, where at least part of the digested sludge obtained is recirculated via a recirculation line to a point upstream of the disintegration system. The invention further relates to a device for the treatment of organic matter, (Continued)

in particular sewage sludge, comprising a disintegration system, a digester downstream thereof, and a recirculation line for at least partially digested disintegrated matter, said recirculation line extending from a point downstream of the digester to a point upstream of the thermal disintegration system.

20 Claims, 1 Drawing Sheet

(51) Int. Cl.
*C05F 7/00* (2006.01)
*C05F 17/00* (2020.01)

(52) U.S. Cl.
CPC .... *C02F 2203/006* (2013.01); *C02F 2209/40* (2013.01); *C02F 2301/043* (2013.01); *C02F 2301/046* (2013.01); *C02F 2303/06* (2013.01); *C02F 2303/22* (2013.01); *Y02A 40/213* (2018.01); *Y02P 20/145* (2015.11); *Y02W 10/23* (2015.05); *Y02W 30/43* (2015.05)

(56) References Cited

U.S. PATENT DOCUMENTS

| | | | |
|---|---|---|---|
| 6,365,047 B1* | 4/2002 | Bischof | B01J 19/246 210/109 |
| 7,255,749 B2* | 8/2007 | Inagaki | B08B 3/00 134/18 |
| 9,403,708 B2 | 8/2016 | Buchmuller | |
| 2006/0163155 A1* | 7/2006 | Chauzy | C02F 3/1221 210/605 |
| 2010/0021979 A1* | 1/2010 | Facey | C12M 21/04 435/147 |
| 2010/0203608 A1 | 8/2010 | Schwarz et al. | |
| 2012/0061318 A1* | 3/2012 | Buchmuller | C02F 11/18 210/631 |

FOREIGN PATENT DOCUMENTS

| | | |
|---|---|---|
| DE | 102007037202 A1 | 2/2009 |
| EP | 0142873 A1 | 5/1985 |
| EP | 0996595 B1 | 7/2001 |
| EP | 1150924 A1 | 11/2001 |
| EP | 2233442 A1 | 9/2010 |
| WO | 8804282 A1 | 6/1988 |
| WO | 9213084 A1 | 8/1992 |
| WO | 03043939 A2 | 5/2003 |
| WO | 2007117152 A1 | 10/2007 |

OTHER PUBLICATIONS

PCT International Search Report dated Feb. 18, 2016, Application No. PCT/EP2015/002172, 4 Pages.

* cited by examiner

METHOD AND DEVICE FOR THE TREATMENT OF ORGANIC MATTER, INVOLVING RECIRCULATION OF DIGESTED SLUDGE

CROSS-REFERENCE TO RELATED APPLICATIONS

This application is a U.S. national phase of PCT Application No. PCT/EP2015/002172 filed Oct. 30, 2015, which claims priority to European Application No. 14003669.0 filed Oct. 30, 2014, the disclosures of which are incorporated in their entirety by reference herein.

TECHNICAL FIELD

The present invention relates to a method for the treatment of organic matter, in particular sewage sludge, which comprises feeding the organic matter to a disintegration system, subjecting the organic matter to thermal hydrolysis in the disintegration system, and feeding the hydrolyzed organic matter to a digester in which the organic matter is at least partially digested. The invention further relates to a device for the treatment of organic matter, in particular sewage sludge, comprising a disintegration system and a digester disposed downstream thereof.

BACKGROUND

When cleaning municipal and commercial sewage by way of mechanical-biological processes, sewage sludge is produced which must be disposed of or returned to the material cycle, respectively. Sludge digestion, as a standard method of biological sludge stabilization, can there lead to a significant reduction in the dry sludge matter. Apart from obtaining recyclable sewage gas, the reduction of dry sludge matter to be disposed of gives rise to economic advantages for the operation of sewage treatment plants. However, conversion of the organic substances from activated sludge is generally limited to 25 to 30%, since they consist largely of a poorly degradable organic cell substance.

A method for the production of biogas is known from WO 2007/117152 A1, wherein heating of organic matter in a digester by way of circulation through a heat exchanger is disclosed therein. Fertilizer is gained in a dewatering device, where parts of the dehydrated residue or the liquid residue can be returned.

Disintegration systems for the destruction of the cell substance contained in sewage sludge are in part provided in prior art, by way of which the degree of degradation and the gas yield can be significantly increased and the dry sludge mass to be disposed of can be reduced.

Sewage sludge disintegration is in prior art defined as the comminution of sewage sludge by the action of external forces (physical, chemical, biological). It leads from the dissolution of the flake structure to the digestion of the microorganisms and particles contained in the sludge. Sewage sludge disintegration therefore also comprises the hydrolysis of sewage sludge, where these terms are often used synonymously in prior art and hereinafter.

A device and a method according to the preamble are known, for example, from EP 2 233 442 A1 It is therein further disclosed that a recirculation line and a recirculation valve are provided through which at least part of the organic matter can be recirculated directly after hydrolysis in order to compensate possibly discontinuously occurring initial quantities of the organic matter, thereby being able to maintain continuous operation of the system. In addition, this recirculation line enables cleaning liquid to be circulated through the system in order to therewith remove possible incrustations from the organic matter in the system.

EP 0 996 595 B1 discloses a method for the treatment of biogenic residual masses in which a reactor heated by hot thermal oil for temperature-pressure hydrolysis is provided, where the slurry leaving the reactor is fed to a fermenter via a stripping column and a device for withdrawing hydrolysis gas. The resulting turbid water can for the production of new slurry be fed to a mashing tank, where the solids content in the turbid water is further reduced by way of a static thickener.

EP 1 150 924 B1 and DE 198 58 187 C 5 describe methods and devices for reducing the organic content of a digestible substrate. In one embodiment, excess sludge is first fed to a digestion tower. Sludge is then removed from the digestion tower by way of a line and is via a thickener and a heat exchanger for thermal disintegration again returned to the digestion tower.

DE 10 2007 037 202 A1 discloses a method for the conversion of biomass into biogas in anaerobic fermenters, where the fermentation residue is downstream of a first fermenter subjected to a solid-liquid phase separation and the separated solid phase is subjected to thermal pressure hydrolysis before it is either returned into the first fermenter reactor or fed to a second fermenter reactor. A steam-operated thermal hydrolysis device is provided upstream of the digester.

It is in WO 92/13084 A1, WO 88/04282 A1 and EP 0 142 873 A1 respectively disclosed that only the liquid portion of the hydrolyzed organic matter is fed to a digester.

If in sewage sludge treatment devices with an upstream hydrolysis system or a disintegration system, respectively, a sludge treatment component, for example a thickener, fails or needs to be serviced upstream of the hydrolysis system, then any organic matter, e.g. thickened sludge, is no longer fed during this time. Consequently, the hydrolysis system would have to be shut down. However, this is disadvantageous because re-starting the hydrolysis system from the cold state can take a very long time, for example up to 16 hours. For this reason, a storage for the organic matter can be provided upstream of the hydrolysis system and buffer sufficient organic matter, such that sufficient organic matter is even in the event of a longer downtime of an upstream component available for the operation of the hydrolysis system and the hydrolysis system must only thereafter in the extreme case be shut down in a controlled manner.

However, such a storage container is expensive and requires much space. With an assumed storage time of one day for a medium-sized sewage treatment plant with a cleaning capacity for a 200,000 population equivalent, such a storage tank would have the size of about 120 m$^3$ (cubic meters).

SUMMARY

It is therefore the object of the invention to provide a method and a device for the treatment of organic matter by way of which the efficiency and operational reliability are improved in a cost-effective manner.

This is satisfied by a method for the treatment of organic matter, in particular sewage sludge, wherein the freshly fed organic matter, i.e. in particular excess sludge or fresh sludge, is first fed to a disintegration system, where thermal hydrolysis of the organic matter then occurs in the disintegration system. In particular disintegrated matter is formed by thermal hydrolysis. Thereafter, the hydrolyzed organic matter, i.e. the disintegrated matter, namely, in particular hydrolyzed fresh sludge or hydrolysate, is fed to a digester in which the organic matter or the disintegrated matter is at least partially digested, so that, in particular, digested sludge is formed. Finally, at least part of the at least partially digested organic matter, i.e. in particular digested sludge, is returned to a point upstream of the disintegration system via a recirculation line. Disintegrated matter is defined as disintegrated organic matter, in particular disintegrated sewage sludge, i.e. the product of the disintegration process prior to further treatment. The disintegrated matter is the totality of the disintegrated organic matter and has a solids component and a liquid component, also referred to as centrate.

In some embodiments or operating states, respectively, the entire at least partially digested organic matter can be recirculated to a point upstream of the disintegration system via a recirculation line, whereas no digested organic matter is removed through the normal drain of the digester. In particular, the recirculated organic matter can also already be entirely digested.

Recirculating at least part of the at least partially digested organic matter to a point upstream of the disintegration system via a direct recirculation line allows for lacking or also fluctuating quantities to be compensated in order to maintain the flow rate in the disintegration system. The desired conditions in the disintegration system can thereby be maintained and a shutdown of the disintegration system or the creation of undesirable conditions, which can lead, for example, to burn-on, can thereby be prevented.

If only the partial recirculation of the hydrolyzed organic matter directly downstream of the disintegration system would take place as provided in prior art, then the temperature in the disintegration system would build up, and impermissible operating temperatures in the disintegration system or in other components of the respective circuit, for example, in the feed pump, would therefore arise within a short period of time. Even very short-term exclusive recirculation of hydrolysate, i.e. of hydrolyzed organic matter, upstream of the digester, to the inlet side of the disintegration system can lead to its emergency shutdown. The digester according to the invention, however, serves as a heat buffer in the recirculation circuit so that the temperature can be prevented from building up. The recirculation according to the invention of at least partially digested organic matter from the digester therefore enables limiting the inlet temperatures which in particular protects the sludge pump upstream of the disintegration system.

Consequently, advantageous decoupling of the operation of the disintegration system from upstream components, i.e. assemblies and/or system parts, can be achieved by the invention.

It can by recirculating the at least partially digested organic matter from the digester also be prevented that quantities of organic matter lacking for thermal hydrolysis must be compensated by water. The supply of water would adversely impair the efficiency of the disintegration system but also all downstream treatment components and increase the operating costs of the system. A large addition of water in the downstream digester results in dilution of its contents with the result that the digester volume to be held available increases significantly due to the necessity of maintaining a minimum hydraulic retention time, which in turn counteracts the aim of increasing the efficiency of the digestion by use of the disintegration.

The digester is in particular a digestion tower. The digestion tower advantageously has a volume of 1000 cubic meters to 5000 cubic meters, and the digester as well as the organic matter contained therein therefore has a considerable heat capacity.

Anaerobic sludge digestion is advantageously performed in the digestion tower in the mesophilic temperature range at 35° C. (Celsius) to 38° C. Alternatively, however, digestion in the thermophilic range can also be conducted at about 48° C. to 55° C., where the advantage of partially observed higher degradation of the organic substance is faced with the disadvantage of a more unstable process.

The anaerobic degradation of organic matter occurs in four phases leading to the end products water, methane, carbon dioxide. In the initial hydrolysis phase, polymeric substances are decomposed by exoenzymes into dissolved low-molecular components. In the second step, the monomeric and oligomeric components are in the acidification phase—also referred to as acidogenesis—converted into reduced organic compounds, e.g. fatty acids, amino acids and alcohols as well as carbon dioxide and hydrogen. Only a portion of the products formed (acetate, carbon dioxide and hydrogen) can be directly utilized by methanogenic bacteria. The remaining fermentation products must be converted to acetate by acidogenic bacteria, which are in close symbiosis with methanogenic bacteria.

The velocity of the entire anaerobic digestion process is limited by the slowest single process. In the case of complex compounds such as sewage sludge, the limiting factor is biological hydrolysis. With the upstream disintegration, biological hydrolysis is supported by the action of external forces or temperature, respectively. This becomes evident from an increase in the gas yield, a higher degree of decomposition of the organic substances, and associated therewith, a reduction in the quantity of sewage sludge. In addition, improvement in the dewatering behavior, reduction of floating sludge and foam in the digestion as well as an increased release of nutrients for their recovery are generally achieved.

In one embodiment of the method, the recirculation is controlled such that a predetermined flow rate is obtained in the disintegration system so that, in particular, a static operating state is given in the disintegration system. The predetermined flow rate can be regulated in dependence of the heating capacity of the disintegration system and/or the viscosity and/or the solids content of the organic matter. An optimum flow through the heat exchangers, regardless of the throughput in the overall system, can thus be achieved, while taking into account the inlet pressure or the pressure loss within the heat exchangers. Advantageously, the recirculation is actively used during normal operation of the disintegration system for maintaining a static operating state in the disintegration system, and in particular in the heat exchangers present therein. A static operating state is understood to be an operating state with a substantially constant flow rate, irrespective of the external inflow to the system. This static operating state can in particular also be upheld in the event of failure of an upstream treatment component, such as, for example, a thickener.

The flow rate in the disintegration system in particular has a flow velocity of 0.4 meters per second to 1.5 meters per second. The risk of burn-on onto the hot walls on the sludge side of the heat exchanger can thereby be significantly reduced since these flow rates form advantageous flow patterns. Manageable pressure losses are additionally given at the flow rates mentioned above. By reducing the risk of burn-on, sufficiently long operating times of the system can be obtained and, in particular, the operating time between flushing and cleaning intervals can be increased. The risk of burn-on is mainly reduced due to a minimum flow rate of 0.4 meters per second. However, the flow rate is advantageously also limited by the aforementioned maximum value. If the quantity of sludge to be treated is nevertheless to be increased, in particular several parallel disintegration systems can be provided.

Thermal hydrolysis of organic matter, in particular organic sludge, is conducted in particular in a temperature range from about 60° C. to 170° C.

In a preferred embodiment, high-thermal hydrolysis is conducted at temperatures beyond 100° C. In particular, disintegration is carried out continuously with this method using exclusively indirect heat exchange between the heating medium and the organic matter. The risks increased thereby with regard to burn-on and the associated shorter operating times when using high-temperature disintegration in prior art can be significantly reduced by the recirculation of at least part of the at least partially decomposed organic matter from the digester.

Further advantageous effects can be obtained in a temperature range from about 140° C. to 170° C., e.g. further increased gas yields, increased decomposition of the organic substance, significant reduction in viscosity and improved dewatering properties.

Thermal hydrolysis at temperatures beyond 100° C. usually requires respective pressure maintenance so that the pressure in the entire heat exchanger system is always clearly above the vapor pressure of the sludge. High-temperature heat is required for heating and is advantageously provided by thermal oil.

The disintegration system advantageously comprises indirect heat exchangers in which the organic matter is materially separated from the heating medium, in particular thermal oil. Indirect heat exchangers can in particular be provided exclusively in the disintegration system.

In order to keep the net energy demand of the system as low as possible, the heat energy of the hydrolyzed organic matter can be transferred to the freshly supplied organic matter in the upstream region of the disintegration system. For this purpose, in particular regenerative heat exchangers are used which have correspondingly large heat transfer surfaces and thereby ensure a high heat recovery rate. They as well are indirect heat exchangers. The differential temperatures between the heat transfer wall in the heat exchanger and the boundary layer of the organic matter can thus be minimized, which increases the operating time. As a result, very rapid passage through the preheating stage can be enabled in order to quickly reach the temperature range in which the viscosity of the sludge is significantly reduced, and the pressure losses can thereby be minimized and the heat transitions be improved.

Recirculating at least partially digested organic matter and/or recirculating hydrolyzed organic matter and intermixing with the organic matter supplied upstream of the disintegration system, in particular in a storage tank, causes the reduction of the viscosity and thus contributes to the reduction of pressure losses and the improvement of heat transfer, both in an optionally provided preheating stage as well as in the thermal disintegration system. In addition, an increase in the temperature of the newly added organic matter can be achieved by the higher temperature of the recirculated organic matter.

Within the aforementioned preheating stage, the temperature of the sludge fed can be increased, for example, from about ambient temperature, i.e. for example 20° C., to above 90° C., and advantageously to above 130° C. and in particular to about 135° C. Less thermal energy must therefore subsequently be introduced into the system by the thermal oil in the disintegration stage for the advantageous reaction temperature of 140° C. to 170° C., and in particular of 150° C. to 160° C., to be reached.

The retention time in the preheating stage of the disintegration system advantageously amounts to 15 minutes to 25 minutes and in particular to about 20 minutes, advantageously approximately 22 minutes. The dwell time in a low-temperature disintegration temperature range of 60° C. to 95° C. is therefore under 6 minutes.

In one embodiment, the organic matter is fed by use of a feed pump through a line from a storage tank directly into the disintegration system. This pump is, in particular, a sludge pump. Directly feeding from the storage tank allows the delivery path of the relatively highly viscous and possibly thickened organic matter to be kept short.

Advantageously, a hydrolysate recirculation line is provided, by use of which part of the hydrolyzed organic matter is recirculated to a point upstream of the disintegration system, where the non-recirculated portion of the hydrolyzed organic matter, i.e. the hydrolysate or the disintegrated matter, is fed to the digester. The hydrolysate recirculation line can additionally be used to obtain a predetermined flow rate in the disintegration system, i.e., not only in particular partially digested organic matter but also hydrolyzed organic matter can be recirculated to achieve the desired flow rate and operating state in the disintegration system. Furthermore, by again passing at least part of the hydrolyzed organic matter through the disintegration system, the degree of hydrolysis can be increased prior to the hydrolyzed organic matter being fed to the digester.

In one embodiment of the method, cleaning liquid, in particular water, possibly with chemical cleaning agents, in particular acid and/or lye, is for cleaning the system circulated through the hydrolysate recirculation line and the disintegration system. The hydrolysate recirculation line extends in particular from a point downstream of the disintegration system and upstream of the digester to a point upstream of the disintegration system. Periodic flushing of the heat exchangers of the disintegration system with water and/or periodic chemical cleaning are advantageous in order to remove to the extent possible incrustation of the heat exchanger tubes in the disintegration system due to deposits and burn-on. The cleaning effect when flushing with water is mainly due to the shear forces caused by the turbulent flow inside the heat exchanger tubes and generally less to the re-dissolution effects. In order to intensify the cleaning effect, the system throughput is advantageously increased when flushing water as compared to normal operation. This is possible because the pressure losses within the heat exchanger tubes also remain relatively low even at considerably higher throughput due to the significantly lower viscosity of the water as compared to organic matter.

In particular organic and mineral fouling occurs in the disintegration system. Chemically cleaning the heat exchangers is advantageously carried out using acid for the re-dissolution of organic and mineral incrustation. On the other hand, burn-on on heat exchanger surfaces can advantageously be removed with the aid of caustic lye of soda. The use of acid and lye is carried out, in particular, in successive chemical flushing operations. The cleaning program runs in particular within a manually started chain of steps, which, however, can be controlled electronically. The concentration of the cleaning solution can be monitored by way of conductivity measurement, where this information can be used in particular for controlling the cleaning process, and the cleaning solution or the acid or lye can be dosed depending thereupon.

This cleaning allows for reliable operation of a high-temperature disintegration system based on indirect heat exchangers.

In particular, cleaning the disintegration system proceeds according to the following scheme: First, the supply of fresh organic matter to the disintegration system is stopped. The organic matter located in the disintegration system is discharged with water, where a valve in the internal hydrolysate recirculation line is at the same time closed, so that no hydrolyzed organic matter is returned to the disintegration system. All the organic matter supplied to the disintegration system therefore reaches the digester. As a result, the filling level in an optionally provided storage tank drops.

Once a minimum filling level has been reached, the storage tank is filled with water while the feed pump continues operation. If no storage tank is provided, then the lines upstream of the disintegration system respectively are filled with water.

During the further discharge of the organic matter from the disintegration system by water, the water quantity supplied is measured, where the content of the disintegration system is known. Once the water quantity supplied corresponds at least to the content of the disintegration system, advantageously plus a safety addition, it can be assumed that substantially only water is present in the system.

The valve of the recirculation line is opened, and at the same time the feed valve to the digestion tower is closed. The water fed by the pump of the disintegration system is now via the hydrolysate recirculation line recirculated to a point upstream of the disintegration system. This operating state is maintained for a determined time, then flushing the disintegration system with water. Thereafter, the soiled water is in the same way as with the aforementioned steps discharged into the digestion tower.

Acid and/or lye can now be dosed, advantageously directly into the storage tank. Advantageously, acid is first added. As described above, the acid solution is circulated through the disintegration system via the internal recirculation line, and after a certain period of time or at a certain degree of fouling, it is discharged with water. Advantageously, the addition of lye then takes place. As described in the previous steps, the lye is also circulated through the internal recirculation line and the disintegration system. However, after completion of the lye cleaning, water flushing is advantageously not performed again, but the lye solution is discharged directly with the organic matter. Advantageously, the concentration of the cleaning agent is respectively monitored by conductivity measurement.

In particular, the recirculated at least partially digested organic matter is upstream of the digester mixed with freshly fed organic matter. This can take place, in particular, in a storage tank, but it is otherwise also possible to perform the mixing only by joining lines.

In an advantageous embodiment, freshly fed organic matter can be passed through a bypass line past the disintegration system and downstream of the disintegration system be fed to the partially hydrolyzed organic matter. The degree of hydrolysis of the organic matter fed to the digester can thereby be reduced. The bypass line is particularly advantageous when water flushing or chemical cleaning of the disintegration system takes place because the fresh organic matter to be treated can then be passed directly into the digester tank past the disintegration system and can be temporarily stored there during the cleaning. The treatment components present upstream of the treatment device according to the invention are therefore not affected, and in particular, for example, a mechanical thickener and a thin sludge pump upstream thereof can continue operation. Without the bypass line, these treatment components would have to be stopped, or, for example, an intermediate buffer tank would need to be provided. After completion of the cleaning, the buffered mass can be returned and treated.

In one embodiment, the at least partially digested organic matter can be removed from the digester via the recirculation line and mixed with freshly fed organic matter, where one part of this mixture is introduced directly into a storage tank or into the disintegration system while the other part is via a circulation line delivered directly into the digester.

The freshly fed organic matter is in particular, fresh sludge, predominantly thin sludge. The thin sludge originates, in particular, from a secondary sedimentation basin of a sewage treatment plant and generally has its solids content increased in a thickener and is then fed as thick sludge to the disintegration system.

According to the invention, a device is further provided for the treatment of organic matter, in particular sewage sludge, which comprises a disintegration system for fresh sludge and a digester downstream thereof, where a recirculation line for at least partially digested organic matter, in particular at least partially digested disintegrated matter is provided, and where the recirculation line extends from a point downstream of the digester to a point upstream of the thermal disintegration system. The recirculation line is in particular arranged and designed to pass partially digested disintegrated matter from a point downstream of the digester to a point upstream of the thermal disintegration system.

The recirculation line is, in particular, a direct recirculation line which is void of treatment components, such as, for example, heating elements or thickening devices. Advantageously, the digester is a digestion tower.

The disintegration system is advantageously composed exclusively of at least one indirect heat exchanger or comprises the latter. The pipes of the indirect heat exchanger have a nominal width of DN20 to DN60, and in particular of DN25 to DN50. The nominal width DN is defined according to DIN ISO 6708. The system is configured within various parameters, in particular the required system output as the quantity of organic matter to be treated, the viscosity of the organic matter to be treated, the maximum pressure loss within the heat exchanger pipes, and/or the heat transfer between the heating medium and the organic matter within the heat exchanger pipes.

As the viscosity of the organic matter increases, specifically higher pressure losses arise in the heat exchanger with simultaneously worsened heat transitions. Although enlargement of the pipe diameters causes reduction in the pressure losses, the thermal transitions are thereby significantly impaired. The aforementioned nominal widths of the heat exchanger pipes allow for an optimum compromise between heat transfer and pressure loss. However, these nominal widths apply, in particular, only for predefined system throughputs which, however, can according to the invention be reliably upheld by recirculating the at least partially digested organic matter, so that the variation of the flow velocity in the heat exchanger pipes can be within narrow limits. The flow velocity in the pipes can thereby be maintained and, in particular, also fluctuating amounts of fresh organic matter can be compensated for.

Advantageously, a storage tank is arranged upstream of the disintegration system, where the recirculation line and a feed line for fresh organic matter each open into the storage tank. This means, the freshly fed and the recirculated organic matter can advantageously intermix in the storage tank.

Advantageously, the recirculation line is part of a circulating circuit, in which a feed line for fresh organic matter is arranged upstream of a removal line, where the removal line is arranged upstream of the disintegration system. Circulation of organic matter can thereby be effected subject to the exclusion of the disintegration system. The disintegration system can thereby, for example, be cleaned independently.

The invention shall now be further explained using embodiments that are illustrated in the following figures.

DETAILED DESCRIPTION

Figure 1:
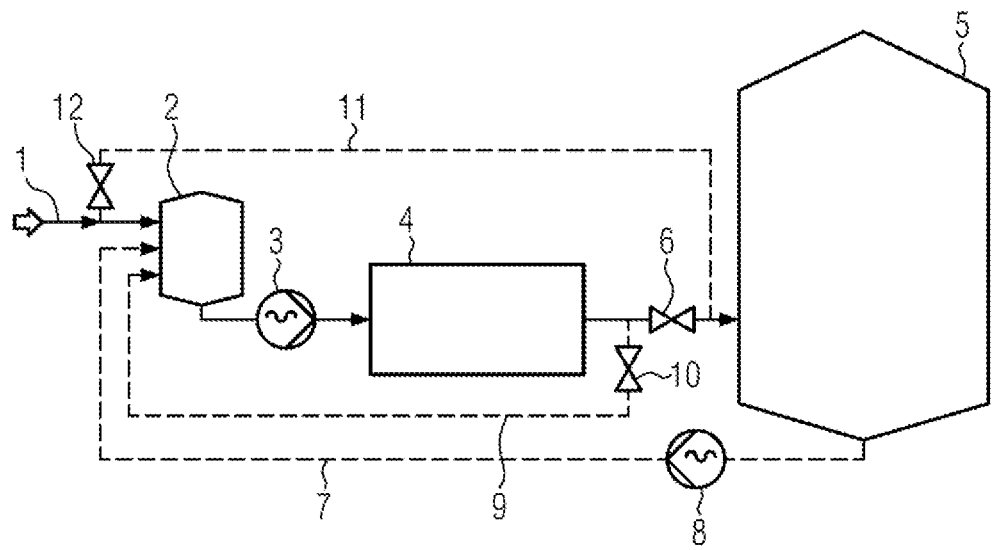
FIG. 1 shows a first embodiment of a device according to the invention for the treatment of organic matter.

FIG. 1 shows an embodiment of a device according to the invention for the treatment of sewage sludge with which an embodiment of the method according to the invention can be implemented. The device comprises a feed line 1 for feeding organic matter in the form of fresh sludge to a storage tank 2. Wastewater or sludge treatment components such as, for example, a thickener can be provided upstream of feed line 1.

A mechanical thickener in the form of a solid-liquid separation unit can be provided as a thickener. Additionally or alternatively, polymers can in the thickener be added to the fresh sludge for increasing its viscosity. The sewage sludge is removed in particular as thin sludge from a secondary sedimentation basin of a sewage treatment plant and converted into thick sludge in at least one of said thickeners (not shown). In other embodiments, the device illustrated can also be connected directly to a secondary sedimentation basin of the sewage treatment plant, so that thin sludge is treated.

The organic matter is then via a feed pump 3 fed from storage tank 2 to a disintegration system 4 in which thermal hydrolysis is performed, in particular at temperatures beyond 100° C. The disintegration system comprises at least one indirect heat exchanger in which the organic matter is by way of thermal oil heated to hydrolysis temperature. A digester 5 is provided downstream of disintegration system 4, where the inflow of disintegrated matter, i.e. hydrolyzed organic matter, can be regulated via a digester valve 6. Digester valve 6 enables in particular interrupting the inflow to digester 5 when disintegration system 4 is cleaned. At least one heating element of a preheating stage can be provided upstream in disintegration system 4 and at least one cooling element of a cooling stage can be provided downstream of disintegration system 4. The heating and cooling elements can also be configured as indirect heat exchangers and be connected via a heating media circuit so that heat can be recovered in the cooling stage and can be used for preheating the organic matter in the preheating stage.

According to the invention, a recirculation line 7 is provided downstream of the digester and removes the digested sludge, i.e. the partially or completely digested organic matter, from digester 5 and recirculates it to a point upstream of thermal disintegration system 4. Recirculation line 7 can in particular be connected in a base region of digester 5. Recirculation line 7 is provided with a recirculation pump 8 which enables delivering the digested sludge to a point upstream of disintegration system 4. Recirculation pump 8 can be provided with a shut-off valve which makes it possible to close recirculation line 7. Alternatively, said shut-off valve can also be provided as a separate component upstream or downstream of recirculation pump 8.

Furthermore, in the embodiment according to FIG. 1, a hydrolysate recirculation line 9 is provided extending from a point between disintegration system 4 and digester valve 6 to a point upstream of disintegration system 4. Hydrolysate recirculation line 8 extends in particular up to storage tank 2. Hydrolysate recirculation line 9 is provided with a hydrolysate recirculation valve 10 which makes it possible to close hydrolysate recirculation line 9. In particular, hydrolysate recirculation valve 10 can be a controllable valve with which predetermined amounts of disintegrated matter can be recirculated. In addition to hydrolysate recirculation valve 10, a hydrolysate recirculation line (not shown) can also be provided.

The embodiment in FIG. 1 therefore by way of hydrolysate recirculation line 9 comprises an internal recirculation or circuit passage and by way of recirculation line 7 comprises an external recirculation or circuit passage.

The flow through recirculation lines 7 and 9 can be regulated such that a predetermined flow rate is obtained in disintegration system 4 which in particular enables a static operating state to be obtained in disintegration system 4. Advantageous conditions in the disintegration system can thereby be created so that, firstly, efficient hydrolysis can be performed and, secondly, the risk of burn-on and deposits can be reduced.

Furthermore, in the event of failure of devices upstream of the device according to the invention, operation of the disintegration system can nevertheless be upheld by way of a circuit, in particular via recirculation line 7, until the problem has been resolved or disintegration system 4 has been shut down in a controlled manner.

This circuit has the particular advantage that digester 5 and the organic matter contained therein form a temperature storage, so that overheating of the organic matter is prevented, which could lead, in particular, to damaging feed pump 3. For this circuit operation, in particular, valve 10 is closed, valve 6 is opened, and pumps 3 and 8 are set to the same delivery rate. During normal operation, recirculation of digested sludge via recirculation line 7 and renewed thermal hydrolysis thereof in disintegration system 4 can enable improved utilization of the organic matter and thus, for example, an increased biogas yield.

Furthermore, a bypass line 11 with a bypass valve 12 is provided in FIG. 1. Bypass valve 12 can in other embodiments of course, be replaced by or added a bypass pump. Bypass valve 12 enables passing freshly fed organic matter parallel to thermal disintegration system 4. For this, the bypass line extends from a point upstream of disintegration system 4 to a point downstream of disintegration system 4. Bypass line 9 in particular extends from a point upstream of storage container 2 to a point downstream of digester valve 6.

The device according to FIG. 1 enables water or cleaning liquid to be circulated via hydrolysate recirculation line 9 while digester 5 is closed by digester valve 6. Bypass line 11 enables disintegration system 4 to be decoupled during this cleaning operation so that the treatment components disposed upstream need not be halted. Otherwise, a correspondingly large-sized and cost-intensive storage container with an additional delivery pump would have to be installed in storage tank 2. According to the invention, however, the organic matter can initially be passed directly into digester 5 and then after completion of the cleaning via recirculation line 7 be recirculated and fed to disintegration system 4.

Recirculation lines 7 and 9 enable recirculation of disintegrated matter and digested sludge into storage tank 2, and operation of disintegration system 4 can thereby be optimized in particular in terms of the flow rate, the pressure losses occurring therein, the heat transfer, and the viscosity of the organic matter therein, even during normal operation without necessarily coupling the upstream treatment components, e.g. the mechanical thickener.

Feed pump 3 is, in particular, a cost-effective standard eccentric screw pump. Operation of this pump is usually monitored via pressure sensors on the output side as well as temperature sensors in the stator. An emergency shutdown of feed pump 3 occurs, in particular, at a temperature of more than 60° C. If, in the event of failure of the upstream system parts, only disintegrated matter were to be recirculated via hydrolysate recirculation line 9, then the temperature of the disintegrated matter would within a short time lead to an excessive temperature in feed pump 3 and thus to an emergency shutdown thereof.

Due to the high degree of automation, the device according to the invention is in municipal sewage treatment systems often operated only during a single shift with an emergency service on weekends and public holidays. The reaction time, for example, in the event of failure of the mechanical thickening upstream of the device according to the invention, is up to 12 hours. If feed pump 3 were now to shut down in an emergency, this would also lead to failure of disintegration system 4. However, it is time-consuming to restart the disintegration system, since a high heat recovery rate is realized during normal operation via the aforementioned preheating and cooling stages, so that renewed heating without heat recovery is time and energy-consuming, thereby causing long and expensive down-time of the device. A combination of internal and external recirculation for stable and reliable operation is for this reason advantageous.

The desired flow volume of the external recirculation via recirculation line 7 can, for example, be determined and controlled via the temperature in the storage tank.

Figure 2:
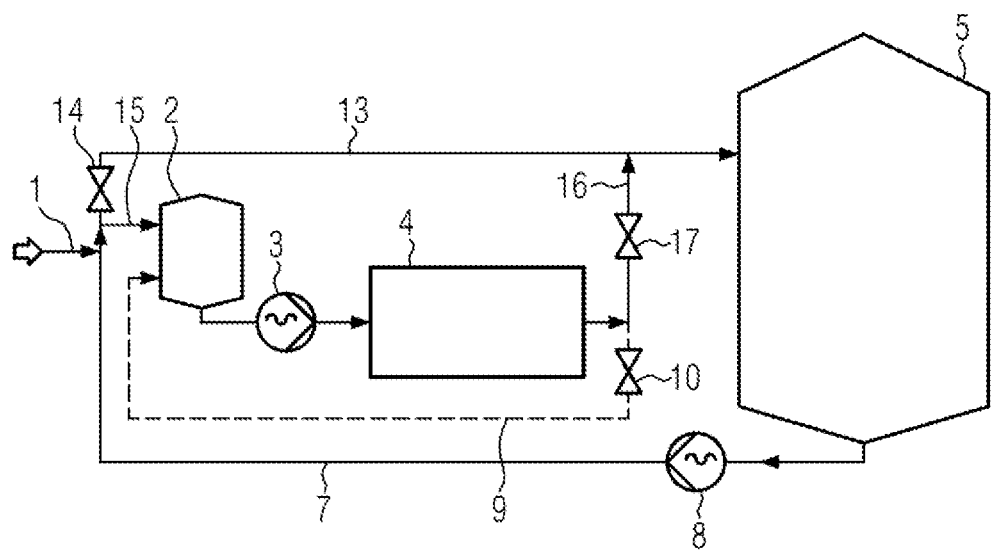
FIG. 2 shows a second embodiment of a device according to the invention for the treatment of organic matter.

FIG. 2 shows an alternative embodiment of the device according to the invention. Recirculation line 7 is there combined to a circulation line 13, the flow rate of which can be regulated by way of a circulation line valve 14. Feeding organic matter via feed line 1 is there effected into recirculation line 7. Downstream of feed line 1, the freshly fed organic matter, during operation of recirculation line 7 mixed with digested sludge, is by way of a removal line 15 fed to storage tank 2.

If circulation line valve 14 is now opened, at least part of the organic matter flows via circulation line 13 directly into digester 5. This in turn allows decoupling disintegration system 4, in particular for cleaning purposes. Otherwise, the organic matter is via removal line 15 fed to storage tank 2 where it is optionally intermixed with disintegrated matter recirculated via hydrolysate recirculation line 9 and is via feed pump 3 fed to thermal disintegration system 4 and thermally hydrolyzed therein. The disintegrated matter is then via a hydrolysate line 16 passed to digester 5.

For cleaning the thermal disintegration system, a hydrolysate line valve 17 is closed and hydrolysate recirculation valve 10 is opened, so that water or cleaning liquid can be circulated through storage tank 2, feed pump 3 and disintegration system 4. Simultaneously, fresh sludge fed to the device is passed via circulating line 13 directly into digester 5.

Recirculation pump 8 allows for intermixing in digester 5.

Furthermore, heating of the digested sludge can be effected by the circulation, where a heating element (not shown) can be provided in circulation line 13 and designed to heat the organic matter to 35° C. to 55° C., so that its temperature is in the mesophilic or thermophilic temperature range.

Recirculation pump 8 can in particular deliver at a constant delivery volume, so that, depending on the quantity of fresh sludge fed via feed line 1, a variable mixing ratio of fresh sludge and digested sludge arises in circulation line 13, which can then without any further regulation be introduced into storage tank 2 and be fed via feed pump 3 to disintegration system 4. The expenses for regulation of the external recirculation can thereby be significantly reduced.

The external recirculation through recirculation line 7 is regulated in particular in dependence of the filling level in storage tank 2. This means that the volume capacity of recirculation pump 8 can be adjusted in dependence of the filling level of storage tank 2. If no storage tank is provided, then it is also possible for the system to be self-regulating, namely that the flow in recirculation line 7 is regulated by the suction pressure upstream of feed pump 3.

The invention claimed is:

1. A method for treatment of organic matter, the method comprising:
    feeding the organic matter to a disintegration system,
    subjecting the organic matter to thermal hydrolysis in the disintegration system to form disintegrated matter,
    feeding the disintegrated matter to a digester in which the disintegrated matter is at least partially digested such that digested sludge is formed,
    recirculating at least part of the obtained digested sludge to a point upstream of the disintegration system via a recirculation line, wherein the recirculated digested sludge is intermixed with freshly fed organic matter, and
    feeding the recirculated digested sludge that is intermixed with freshly fed organic matter directly into the disintegration system.

2. The method according to claim 1 wherein the recirculation is controlled such that a predetermined flow rate is obtained in the disintegration system so that a static operating state is given in the disintegration system.

3. The method according to claim 1 wherein the flow rate in the disintegration system has a flow velocity of 0.4 meters per second to 1.5 meters per second.

4. The method according to claim 1 wherein high-thermal hydrolysis is conducted in the disintegration system at temperatures beyond 100° C.

5. The method according to claim 1 wherein a hydrolysate recirculation line is additionally provided, by way of which at least part of the disintegrated matter can be recirculated to a point upstream of the disintegration system, where the non-recirculated portion of the disintegrated material is fed to the digester.

6. The method according to claim 5 wherein cleaning liquid for cleaning the system is circulated through the hydrolysate recirculation line and the disintegration system.

7. The method according to claim 6 wherein the supply of fresh organic matter to the disintegration system is stopped prior to cleaning and the organic matter located in the disintegration system is discharged with water into the digester.

8. The method according to claim 7 wherein the cleaning liquid comprises a chemical cleaning agent, and wherein the concentration of the cleaning agent is monitored by way of conductivity measurement.

9. The method according to claim 1 wherein freshly fed organic matter is via a bypass line passed past the disintegration system and fed downstream of the disintegration system to the disintegrated matter.

10. The method according to claim 1 wherein the digested sludge is removed from the digester by way of the recirculation line and mixed with freshly fed organic matter, and a part thereof is fed directly into a storage tank or the disintegration system, while the other part is via a circulation line delivered directly into the digester.

11. A device for treatment of organic matter, the device comprising:
   A feed line for fresh organic matter;
   A thickener provided upstream of the feed line;
   A disintegration system provided downstream of the feed line and configured to carry out thermal hydrolysis on the organic matter to form disintegrated matter;
   A digester arranged downstream of the disintegration system and configured to at least partially digest the disintegrated matter; and
   A recirculation line for at least partially digested disintegrated matter from the digester, wherein the recirculation line extends from a point downstream of the digester to a point upstream of the disintegration system and downstream of the feed line.

12. The device according to claim 11 wherein the disintegration system comprises an indirect heat exchanger in which pipes for the organic matter are provided having a nominal width of DN 20 to DN 60.

13. The device according to claim 11 further comprising a storage tank arranged upstream of the disintegration system, wherein the recirculation line and the feed line each open into the storage tank.

14. The device according to claim 11 wherein the recirculation line is part of a circulation circuit, in which the feed line is arranged upstream of a removal line, and wherein the removal line is arranged upstream of the disintegration system.

15. The method according to claim 6 wherein the cleaning liquid comprises water.

16. The method according to claim 15 wherein the cleaning liquid comprises a chemical cleaning agent.

17. The method according to claim 15 wherein the cleaning liquid comprises acid and/or lye.

18. The device according to claim 12 wherein the pipes have a nominal width of DN 25 to DN 50.

19. A method for treatment of organic matter, the method comprising:
   feeding the organic matter to a disintegration system,
   subjecting the organic matter to thermal hydrolysis in the disintegration system to form disintegrated matter,
   feeding the totality of the disintegrated matter having a solids component and a liquid component to a digester in which the disintegrated matter is at least partially digested such that digested sludge is formed, and
   recirculating at least part of the obtained digested sludge to a point upstream of the disintegration system via a recirculation line.

20. The method according to claim 19 wherein the recirculated digested sludge is intermixed with freshly fed organic matter.

* * * * *